US010528490B2

(12) United States Patent
Barnes

(10) Patent No.: US 10,528,490 B2
(45) Date of Patent: Jan. 7, 2020

(54) APPARATUS AND METHOD FOR MANAGING BOUNDED POINTERS

(71) Applicant: ARM LIMITED, Cambridge, Cambridgeshire (GB)

(72) Inventor: Graeme Peter Barnes, Cambridge (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/771,107

(22) PCT Filed: Oct. 19, 2016

(86) PCT No.: PCT/GB2016/053260
§ 371 (c)(1),
(2) Date: Apr. 26, 2018

(87) PCT Pub. No.: WO2017/093708
PCT Pub. Date: Jun. 8, 2017

(65) Prior Publication Data
US 2018/0349294 A1    Dec. 6, 2018

(30) Foreign Application Priority Data
Dec. 2, 2015  (GB) .................................. 1521276.4

(51) Int. Cl.
G06F 12/14    (2006.01)
G06F 9/30     (2018.01)
(Continued)

(52) U.S. Cl.
CPC ........ G06F 12/1441 (2013.01); G06F 9/3004 (2013.01); G06F 9/324 (2013.01);
(Continued)

(58) Field of Classification Search
CPC .... G06F 9/3004; G06F 9/30043; G06F 9/324; G06F 9/34; G06F 9/3861; G06F 9/468;
(Continued)

(56) References Cited

U.S. PATENT DOCUMENTS 5,325,496 A     6/1994 Hays et al.
2004/0019774 A1  1/2004 Fuchikami et al.
(Continued)

OTHER PUBLICATIONS

International Search Report and Written Opinion of the ISA for PCT/GB2016/053260, dated Jan. 31, 2017, 12 pages.
(Continued)

Primary Examiner — Gary J Portka
(74) Attorney, Agent, or Firm — Nixon & Vanderhye P.C.

(57) ABSTRACT

An apparatus and method are provided for managing bounded pointers. The apparatus has processing circuitry to execute a sequence of instructions, and a plurality of storage elements accessible to the processing circuitry, for storage of bounded pointers and non-bounded pointers. Each bounded pointer has explicit range information associated therewith indicative of an allowable range of memory addresses when using the bounded pointer. A current range check storage element is then used to store a current range check state for the processing circuitry. When the current range check state indicates a default state, the processing circuitry is responsive to execution of a memory access instruction identifying a pointer to be used to identify a memory address, to perform a range check operation to determine whether access to that memory address is permitted. In particular, when the memory access instruction identifies as the pointer one of the bounded pointers, the range check operation is performed with reference to the explicit range information associated with that bounded pointer. If instead the memory access instruction identifies a non-bounded pointer, the range check operation is performed with reference to default
(Continued)

range information defined for the processing circuitry. On detection of at least one event, the current range check state is set to an executive state. When in the executive state, the processing circuitry is responsive to execution of a memory access instruction to disable the range check operation when the identified pointer is a non-bounded pointer. This provides an efficient, but controlled, mechanism for enabling the set of bounded pointers available to the processing circuitry to be altered.

18 Claims, 11 Drawing Sheets

(51) Int. Cl.
*G06F 9/32* (2018.01)
*G06F 9/38* (2018.01)
*G06F 9/46* (2006.01)
*G06F 9/54* (2006.01)

(52) U.S. Cl.
CPC ............ *G06F 9/3861* (2013.01); *G06F 9/468* (2013.01); *G06F 9/542* (2013.01); *G06F 2212/1052* (2013.01)

(58) Field of Classification Search
CPC .... G06F 9/542; G06F 12/1441; G06F 12/145; G06F 2212/1052
USPC ................................ 711/152, 154, 163, 201
See application file for complete search history.

(56) References Cited

U.S. PATENT DOCUMENTS

| | | | |
|---|---|---|---|
| 2009/0172332 A1* | 7/2009 | Ono ................... | G06F 12/1425 711/163 |
| 2010/0174893 A1 | 7/2010 | Rivera | |
| 2010/0223438 A1* | 9/2010 | Vermeulen .......... | G06F 12/1441 711/163 |
| 2011/0078389 A1 | 3/2011 | Patel et al. | |
| 2011/0093750 A1 | 4/2011 | Williams et al. | |
| 2018/0196746 A1* | 7/2018 | Craske ................ | G06F 12/1441 |

OTHER PUBLICATIONS

Search Report for GB1521276.4, dated May 13, 2016, 4 pages.
Suffield, "Bounds Checking for C and C++", Jan. 1, 2003, XP055336403, retrieved from the internet: URL:http://www.imperial.ac.uk/pls/portallive/docs/1/18619746.pdf, 55 pages.
Watson et al., "Capability Hardware Enhanced RISC Instructions: CHERI Instruction-set architecture", University of Cambridge Technical Report, No. 850, Apr. 2014, 131 pages.

* cited by examiner

A) SET   PR1 = 140000   ⟶ trigger error

B) SET   PR1 = 140000

LD   R5,   PR1   ⟶ trigger error

SAVED PROCESS STATE
REGISTER (SPSR)

(POPULATED ON TAKING AN EXCEPTION)

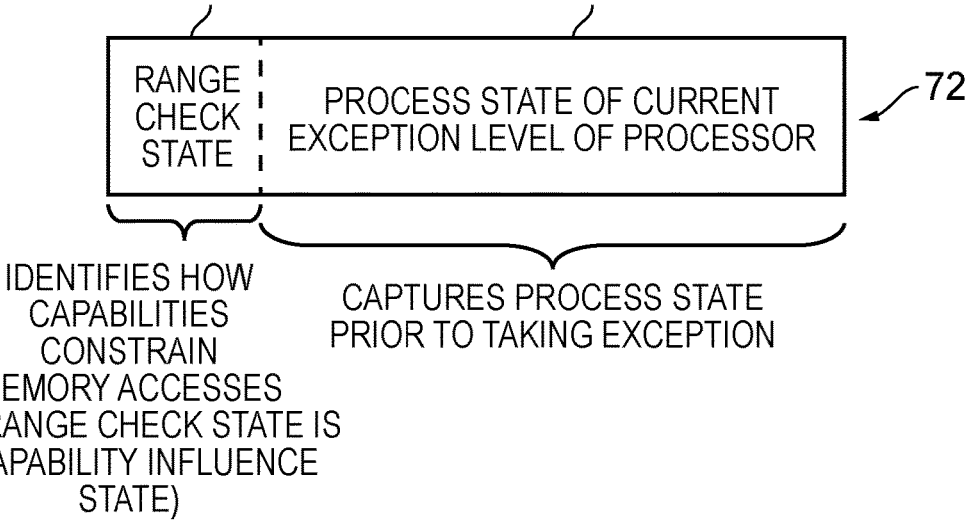

IDENTIFIES HOW CAPABILITIES CONSTRAIN MEMORY ACCESSES (I.E. RANGE CHECK STATE IS A CAPABILITY INFLUENCE STATE)

CAPTURES PROCESS STATE PRIOR TO TAKING EXCEPTION

CURRENT RANGE CHECK STATE

DEFAULT (RESTRICTED) STATE - BOTH EXPLICIT AND IMPLICIT CAPABILITIES ARE CHECKED ON ACCESS TO MEMORY

EXECUTIVE STATE - IMPLICIT CAPABILITIES ARE NOT CHECKED ON ACCESS TO MEMORY

EXPLICIT CAPABILITIES MAY OR MAY NOT BE CHECKED DEPENDENT ON EMBODIMENT

FIG. 5

APPARATUS AND METHOD FOR MANAGING BOUNDED POINTERS

This application is the U.S. national phase of International Application No. PCT/GB2016/053260 filed 19 Oct. 2016, which designated the U.S. and claims priority to GB Patent Application No. 1521276.4 filed 2 Dec. 2015, the entire contents of each of which are hereby incorporated by reference.

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

A number of bounded pointer registers may be provided for storing bounded pointers for access by the processing circuitry of the data processing apparatus. Each bounded pointer within such a bounded pointer register will identify a non-extendible range of memory addresses accessible by the processing circuitry, and hence each bounded pointer may be referred to as a capability (identifying an allowable range of memory addresses that the processing circuitry is capable of accessing). Whilst the processing circuitry may be allowed to take steps to reduce the range associated with any particular bounded pointer available to it, it cannot in normal operation extend the range in order to seek to increase the capability afforded to the processing circuitry by that bounded pointer.

Any particular range of memory addresses identified by a bounded pointer within a bounded pointer register may contain data, instructions and/or other capabilities (i.e. other bounded pointers). Hence, it will be appreciated that at any point in time the processing circuitry's ability to access memory is defined by a set of capabilities comprising the capabilities identified in the bounded pointer registers and any further capabilities accessible via the capabilities held in those bounded pointer registers, and this set of capabilities will be referred to herein as a capability domain.

There may be a need during operation of the data processing apparatus to seek to alter the capability domain of the processing circuitry. However, this may require access to memory addresses that are not accessible given the capabilities of the current capability domain.

It would be desirable to provide an efficient and reliable mechanism for enabling such a change in the capability domain of the processing circuitry.

In one example configuration, there is provided an apparatus, comprising: processing circuitry to execute a sequence of instructions; a plurality of storage elements accessible to the processing circuitry, for storage of bounded pointers and non-bounded pointers, each bounded pointer having explicit range information associated therewith indicative of an allowable range of memory addresses when using said bounded pointer; and a current range check storage element to store a current range check state for the processing circuitry; when the current range check state indicates a default state, the processing circuitry being responsive to execution of a memory access instruction in the instruction sequence identifying a pointer to be used to identify a memory address, to perform a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing circuitry; on detection of at least one event, the current range check state being set to an executive state, and when in the executive state the processing circuitry being responsive to execution of said memory access instruction to disable the range check operation when the identified pointer is a non-bounded pointer.

In another example configuration, there is provided a method of operating an apparatus having processing circuitry to execute a sequence of instructions, and a plurality of storage elements for storage of bounded pointers and non-bounded pointers for access by the processing circuitry, each bounded pointer having explicit range information associated therewith indicative of an allowable range of memory addresses when using said bounded pointer, the method comprising: storing a current range check state for the processing circuitry; when the current range check state indicates a default state, then responsive to execution of a memory access instruction in the instruction sequence identifying a pointer to be used to identify a memory address, performing a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing circuitry; and on detection of at least one event, setting the current range check state to an executive state, when in the executive state the processing circuitry being responsive to execution of said memory access instruction to disable the range check operation when the identified pointer is a non-bounded pointer.

In a yet further example configuration, there is provided an apparatus, comprising: processing means for executing a sequence of instructions; a plurality of storage element means for access by the processing means, and for storage of bounded pointers and non-bounded pointers, each bounded pointer having explicit range information associated therewith indicative of an allowable range of memory addresses when using said bounded pointer; and a current range check storage element means for storing a current range check state for the processing means; when the current range check state indicates a default state, the processing means for performing, responsive to execution of a memory access instruction in the instruction sequence identifying a pointer to be used to identify a memory address, a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing means; on detection of at least one event, the current range check state being set to an executive state, and when in the executive state the processing means for disabling the range check operation during execution of the memory access instruction when the identified pointer is a non-bounded pointer.

The present technique will be described further, by way of example only, with reference to embodiments thereof as illustrated in the accompanying drawings, in which.

Figure 4:
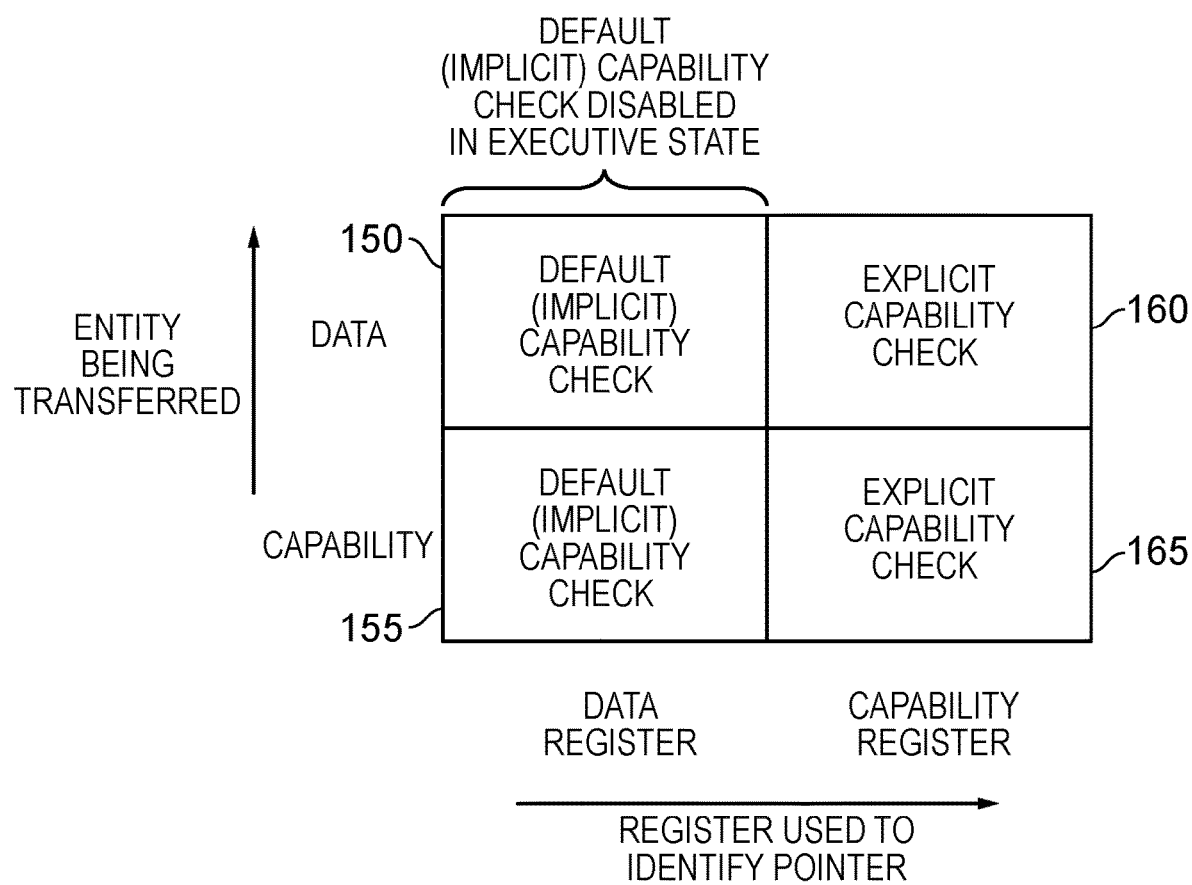
Figure 6:
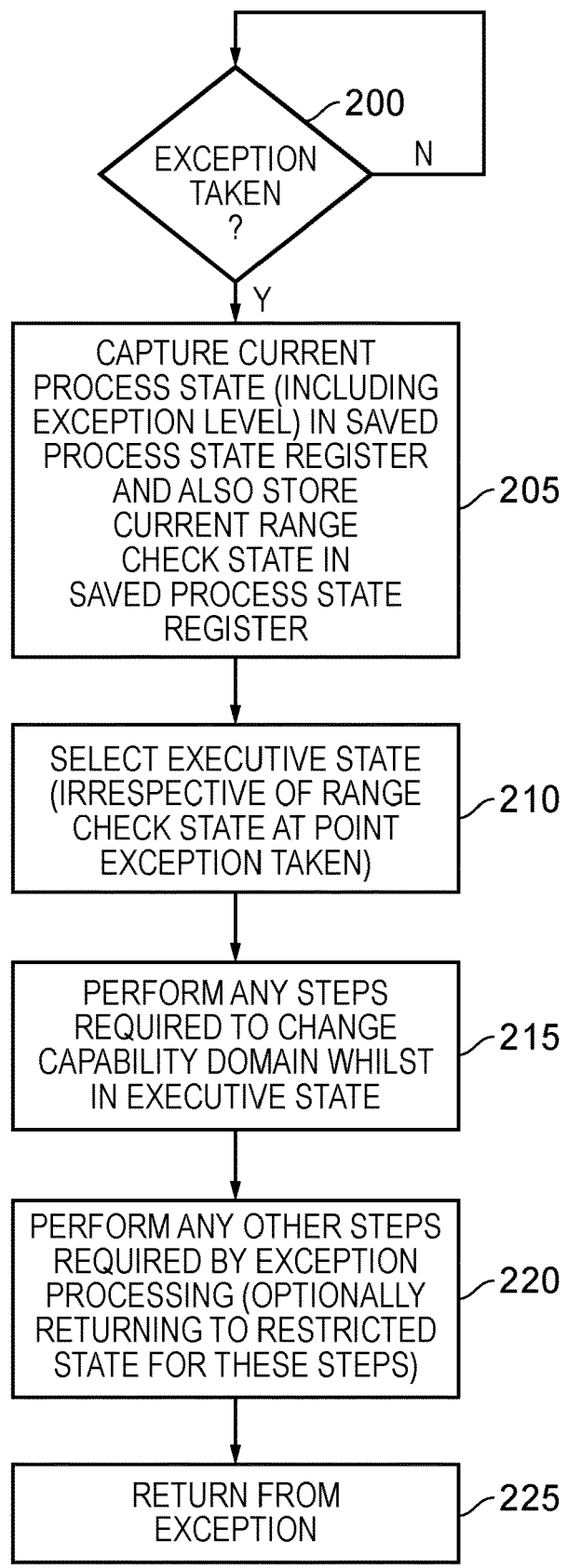
Figure 7:
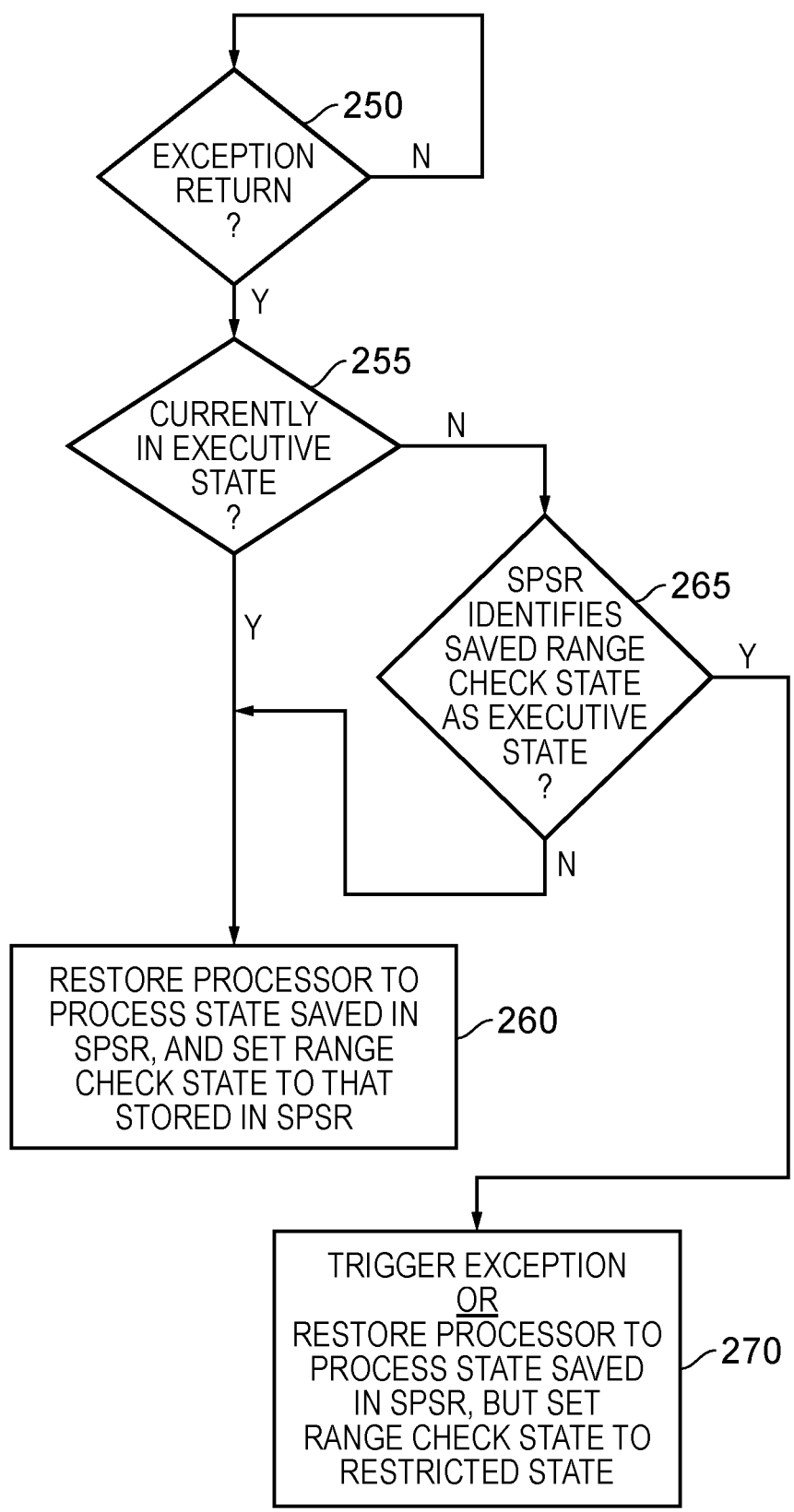
Figure 8:
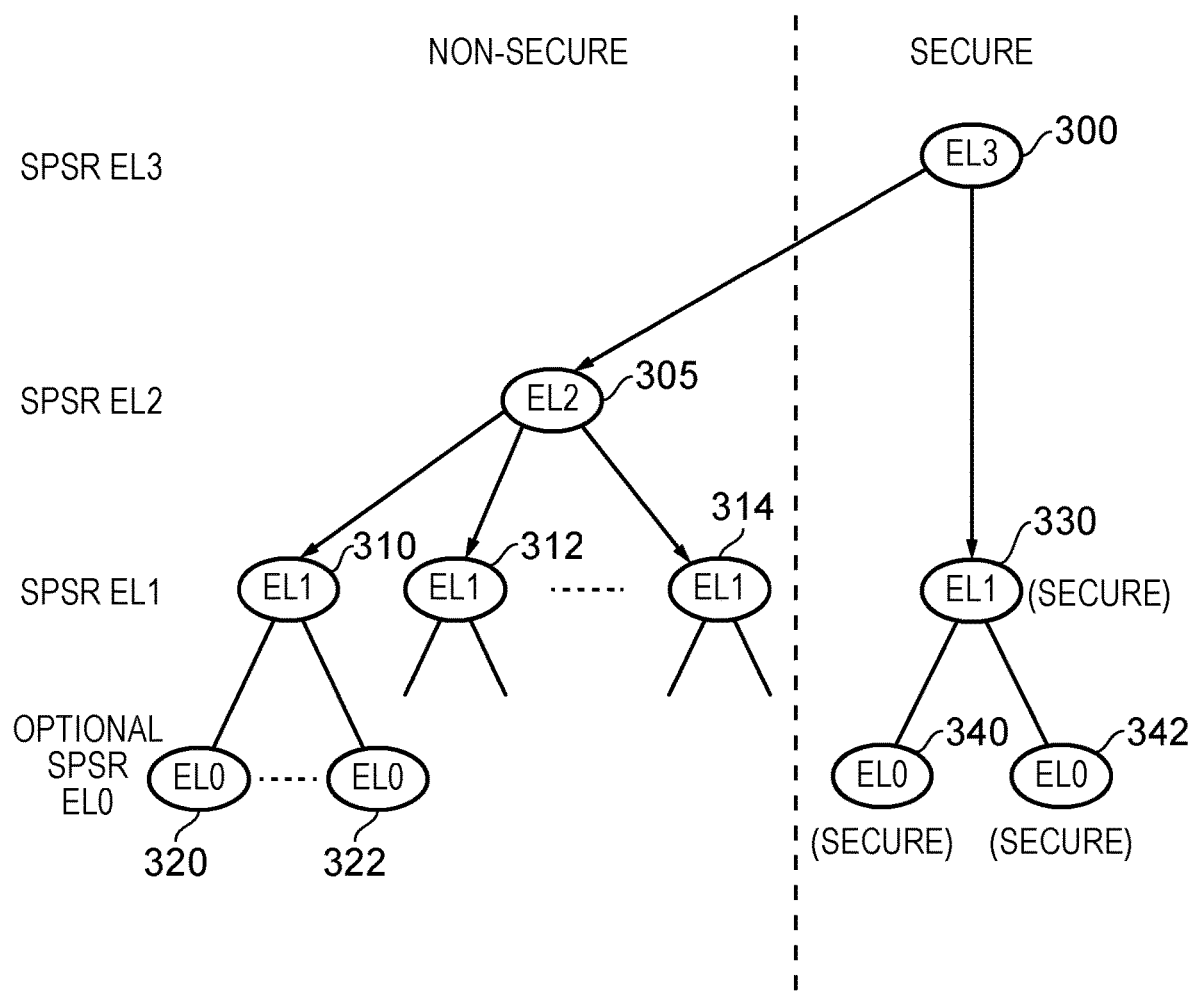
Figure 9:
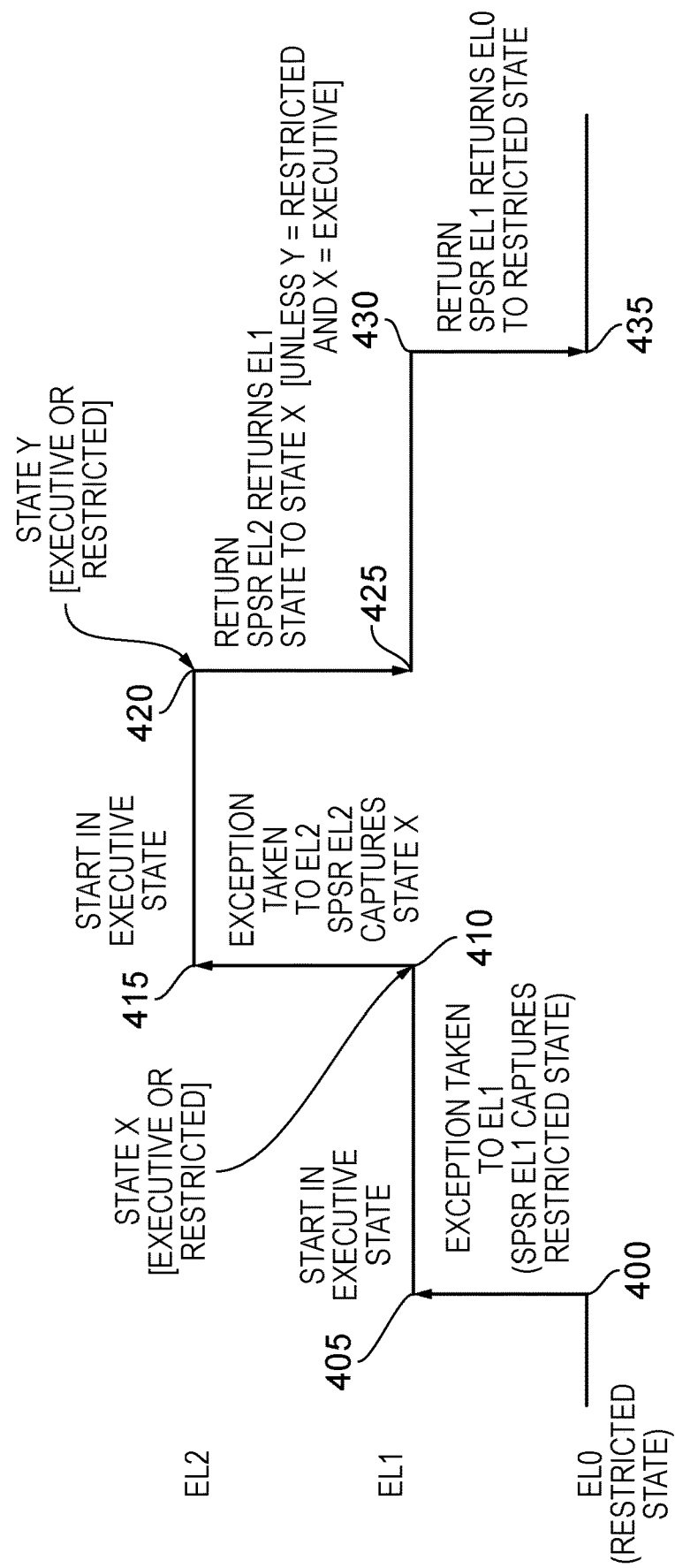
Figure 10:
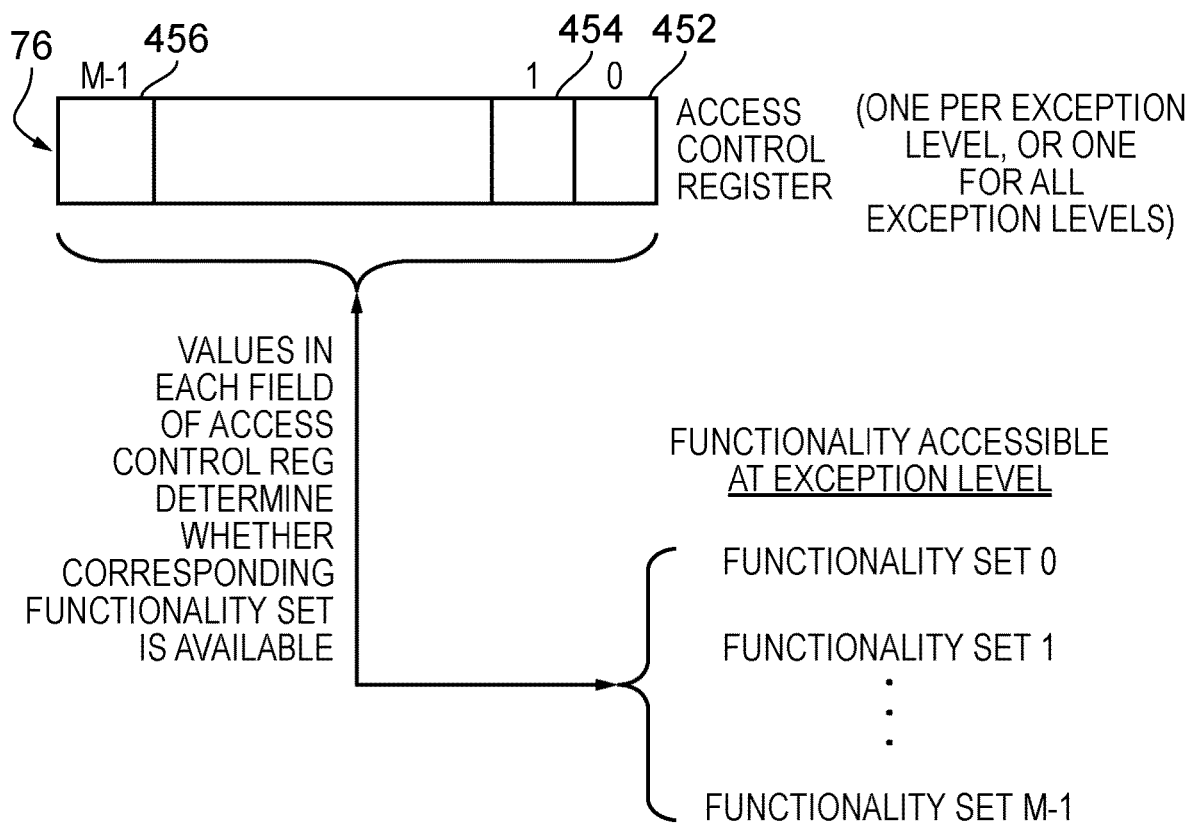
Figure 11:
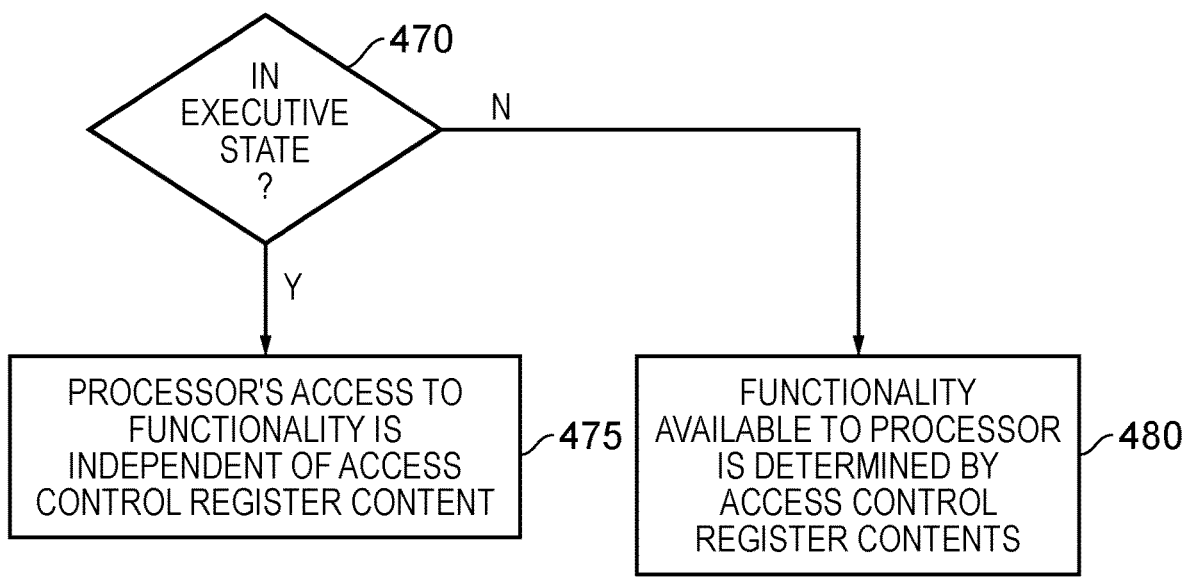

FIG. 4 schematically illustrates how memory accesses are policed in accordance with capabilities in a variety of different situations, in accordance with one embodiment;

FIG. 5 is a diagram illustrating data saved within a saved process state register on taking an exception, in accordance with one embodiment, and identifies two possible current range check states in accordance with one embodiment;

FIG. 6 is a flow diagram illustrating steps performed on taking an exception in accordance with one embodiment;

FIG. 7 is a flow diagram illustrating steps taken when returning from an exception in accordance with one embodiment;

FIG. 8 illustrates how multiple exception levels may be provided in accordance with one embodiment;

FIG. 9 illustrates an example sequence of transitions between various exception levels due to the taking of exceptions and subsequent returns from those exceptions, in accordance with one embodiment;

FIG. 10 illustrates the format of an access control register provided in accordance with one embodiment; and FIG. 11 is a flow diagram illustrating how the access control register of FIG. 10 is used dependent on whether the range check state is currently the executive state or not, in accordance with one embodiment.

Before discussing the embodiments with reference to the accompanying figures, the following description of embodiments is provided.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability.

Hence, an apparatus may have bounded pointer storage elements used to store a pointer having associated range information indicative of an allowable range of addresses when using the pointer. Each bounded pointer storage element could be a register, or a memory location in general purpose memory, for example a location on a stack memory.

Memory access instructions can be used to reference such a bounded pointer storage element in order to obtain a pointer which is then used to derive an address in memory required during operation of the instruction. The pointer may be used directly to identify the memory address, or may be used to determine the memory address, for example by the addition of an offset to the pointer value.

It is also possible that certain memory access instructions may identify a non-bounded pointer stored within general purpose registers of the data processing apparatus. To ensure that those accesses are also constrained, default range information may be specified (which in one embodiment may be derived from a range associated with at least one of the bounded pointers available to the processing circuitry), and any memory access that is to be performed with reference to a non-bounded pointer has the memory address checked against the default range information.

By such an approach, it is possible to effectively police memory accesses made by the processing circuitry, whether performed with reference to the explicit bounded pointers available to the processing circuitry in accordance with a current capability domain, or using non-bounded pointers (by effectively constraining them to a default range of memory addresses that is within the allowable memory address range of the current capability domain). However, as mentioned earlier, a problem that arises is how to efficiently and reliably provide a mechanism that would enable the capability domain to be changed.

In accordance with one embodiment an apparatus is provided which has processing circuitry to execute a sequence of instructions, and a plurality of storage elements that are accessible to the processing circuitry, and within which both bounded pointers and non-bounded pointers may be stored. Each bounded pointer has explicit range information associated therewith indicative of an allowable range of memory addresses when using the bounded pointer. Further, the apparatus has a current range check storage element to store a current range check state for the processing circuitry. The possible values for the current range check state comprise a default state and an executive state. When in the default state, the processing circuitry is responsive to execution of a memory access instruction identifying a pointer to perform a range check operation to determine whether access to the memory address derived from the pointer is permitted. In particular, when the memory access instruction identifies one of the bounded pointers the range check operation is performed with reference to the explicit range information associated with that bounded pointer. If instead the memory access instruction identifies one of the non-bounded pointers, the range check is performed with reference to default range information defined for the processing circuitry. This hence ensures that the security associated with a current capability domain is enforced.

However, on detection of at least one event, the current range check state is set to an executive state. When in the executive state, when the processing circuitry then executes a memory access instruction, the range check operation is disabled when the identified pointer is a non-bounded pointer. By such an approach, this provides a mechanism which allows the processing circuitry operating in the executive state to access memory addresses derived from non-bounded pointers even where those memory addresses lie outside the allowable range of memory addresses defined by the current capability domain. Through this mechanism, it is hence possible to perform one or more memory accesses whilst the processing circuitry is in the executive state in order to alter the set of bounded pointers that are to be made available to the processing circuitry. For example, by such a mechanism, both non-bounded pointers and bounded pointers can be moved between the plurality of storage elements and memory in either direction, including in respect of memory addresses that lie outside the capability domain that was associated with the processing circuitry when previously executing in the default state. As a result, when the processing circuitry subsequently returns from the executive state to the default state, it can be provided with a modified set of bounded pointers, and hence a modified capability domain.

However, since the range check operation for non-bounded pointers is only disabled when the processing circuitry is in the executive state, and the transition to the executive state takes place on detection of one or more specified events, the processing circuitry's ability to change the capability domain can be tightly controlled. This hence provides a very efficient and reliable mechanism for changing the set of bounded pointers available to the processing circuitry, and hence changing the capability domain.

The type of event that causes the current range check state to be set to the executive state can take a variety of forms, but in one embodiment comprises the taking of an exception by the processing circuitry. Hence, in one embodiment, when an exception is taken, then the processing circuitry is arranged to transition to the executive state, irrespective of the current range check state at the time the exception was taken. This then enables the exception handling operation that is triggered by taking the exception to have the opportunity to make certain changes to the set of bounded pointers available to the processing circuitry whilst it remains in the executive state.

In one embodiment, the apparatus further comprises a saved range check storage element to store a saved range check state. On taking of the exception the saved range check storage element is updated to store as the saved range check state the current range check state used by the processing circuitry prior to the current range check state being set to the executive state in response to the exception being taken. Hence, this ensures that the current range check state being used by the processing circuitry at the time the exception was taken is captured, allowing that information to be referred to later.

In particular, in one embodiment, on return from the exception the current range check storage element is then updated to identify as the current range check state the saved range check state as previously captured in the saved range check storage element.

If any modification is made to the set of bounded pointers by the performance of one or more memory accesses whilst the processing circuitry was in the executive state, then on return from the exception the processing circuitry will then have that modified set of bounded pointers available to it.

In addition to being able to alter the set of available bounded pointers by loading into the plurality of storage elements one or more bounded pointers that reside at memory addresses not previously accessible by the current capability domain, and/or by further altering the accessible memory address range by arranging such bounded pointers to include memory address regions where other (previously inaccessible) bounded pointers are stored, it is also possible whilst in the executive state to allow the processing circuitry to alter the range information associated with a particular bounded pointer. Hence, a bounded pointer that the processing circuitry had access to in accordance with a current capability domain may have its associated range information increased to effectively increase the rights associated with that bounded pointer. In particular, there may be provided certain privileged instructions, or capabilities which may convey privilege to instructions, which can modify an existing bounded pointer (capability) to add more rights than it currently provides, by increasing the associated range, or any associated permissions. However, by use of the range check state of the above described embodiments, the ability of such instructions to modify an existing capability can be constrained to when the processing circuitry is in the executive state, so that any such changes to a bounded pointer are restricted to being performed whilst the processing circuitry is in the executive state.

In one embodiment, whilst in the executive state, the range check operation is still performed if a memory access instruction identifies a bounded pointer that is to be used to determine the memory address accessed. Hence, the constraints associated with any specific bounded pointers are still enforced whilst in the executive state if those bounded pointers are used to access memory. However, in an alternative embodiment, when in the executive state, the processing circuitry may be arranged to further disable the range check operation when the pointer specified by a memory access instruction is a bounded pointer, thereby providing further enhanced flexibility for the processing circuitry operating in the executive state to access memory address range(s) outside of the memory address range(s) associated with the current capability domain.

The default range information defined for the processing circuitry may be specified in a variety of ways, but in one embodiment a default range storage element is provided in which the default range information is stored. In one embodiment, the range information stored within the default range storage element is derived from range information associated with one or more of the bounded pointers available to the processing circuitry in the current capability domain.

In one embodiment, the processing circuitry is arranged to issue a fetch memory address to identify an instruction to be fetched for subsequent execution by the processing circuitry, when in the default state the processing circuitry being arranged to perform a fetch range check operation prior to issuing the fetch memory address in order to determine, with reference to default fetch range information defined for the processing circuitry, whether access to the fetch memory address is permitted. However, when in the executive state, the processing circuitry is arranged to disable the fetch range check operation.

By disabling the fetch range check operation when in the executive state, this allows the processing circuitry to access instructions that it could not access before whilst in the default state. This hence provides flexibility as to what instructions are executed to implement the exception handling operation performed on taking the exception.

The fetch memory address can be derived in a variety of ways, but in one embodiment is determined by a program counter value, and in such an embodiment the default fetch range information is program counter range information.

The default fetch range information can be specified in a variety of ways, but in one embodiment is constrained to be a range of memory addresses within the allowable range of memory addresses specified by one or more of the bounded pointers available to the processing circuitry in the current capability domain.

In one embodiment, the processing circuitry may be operable at a plurality of exception levels, where each exception level has different software execution privilege. The processing circuitry may then be arranged, in response to at least a subset of exceptions taken by the processing circuitry, to change the exception level that it is operating at. In one embodiment, the current range check state is orthogonal to the various exception levels, and hence when the processing circuitry is operating in at least one of the exception levels, the current range check state may be switched between the executive state and the default state whilst remaining at that same exception level.

In some instances, on taking an exception, the processing circuitry may remain at the same exception level, and merely transition to the executive state on taking the exception, and in due course return to the restricted state on return from the exception.

However, in other instances, taking the exception causes the processing circuitry to transition from a first exception level to a second exception level, the saved range state storage element is updated to identify the range check state being used by the processing circuitry at the first exception level prior to the exception being taken, and the current range check state is set to the executive state on transitioning the processing circuitry to the second exception level. In one embodiment, the second exception level will have a higher level of software execution privilege than the first exception level.

Whilst the processing circuitry is performing the exception handling operation at the second exception level, it may in one embodiment stay in the executive state for the entirety of that period. However, in an alternative embodiment, during operation at the second exception level the processing circuitry may be arranged to change the current range check state from the executive state to the default state. In particular, in one embodiment, it may be arranged that the processing circuitry remains in the executive state only for as long as is required to perform any modifications that are constrained to being performed while the processing circuitry is in the executive state. Thereafter, the processing circuitry returns to the default state for the remainder of the performance of the exception handling operation. By such an approach, the code that actually needs to operate in the executive state can be constrained to be small, self-contained and verifiable. Other code executed by the processing circuitry at the second exception level need not then be trusted to execute whilst the processing circuitry is in the executive state, and instead the processing circuitry returns to the default state prior to executing such code.

In one embodiment, on return from the exception the processing circuitry is arranged to transition back to the first exception level, and the current range check storage element is updated to identify as the current range check state the saved range check state unless this would cause the current range check state to change from the default state to the executive state on return from the exception.

There are a number of ways in which detection of an attempted change from the default state back to the executive state on return from the exception could be handled. In one embodiment, on detection of such a scenario, a further exception could be taken in order to implement an appropriate exception handling routine. In an alternative embodiment, all other aspects of the process state could be restored for the processing circuitry when it returns to the first exception level, but rather than allowing the range check state to be changed to the executive state, it is instead forced to stay in the default state. When in the default state, all of the memory access checks associated with the default state will then be in place, and hence will constrain what addresses in memory can be accessed by the processing circuitry.

During operation, the processing circuitry may have access to a number of system registers and operations such as translation context controls, system call and exception return. In some instances, instead of allowing unrestricted access, known access control mechanisms may be used to place some limitations on access to the system registers and operations by the processing circuitry. However, access to such system registers and operations (also referred to herein as functionality) can potentially undermine the security provided by the capability domain. In order to alleviate this issue, in one embodiment the apparatus further comprises an access control storage element having one or more fields, each field being associated with a corresponding set of functionality and having a value indicating accessibility of that corresponding set of functionality to the processing circuitry when the processing circuitry is in the default state. When in the executive state, the processing circuitry's access to each corresponding set of functionality is independent of the associated value in the access control storage. By such an approach, when in the default state the ability of the processing circuitry to access certain sets of functionality can be constrained by the content of the access control register, hence reducing the ability for the security afforded by the capability domain to be undermined. However, when in the executive state, the contents of the access control storage are effectively ignored, and the processing circuitry's access to the various sets of functionality controlled by the access control storage is not governed by the associated values in the access control storage.

Instead, in the executive state the processing circuitry may have unrestricted access to certain sets of functionality or may have access controlled by existing access control mechanisms. However, when in the default state, the use of the access control registers can enable further limitations to be placed on access to at least some of the sets of functionality, over and above any limitations in place when in the executive state.

In one embodiment, in the default state the processing circuitry is prevented from updating the access control storage element. Instead, any updates to the access control storage are constrained to be performed whilst the processing circuitry is in the executive state.

Particular embodiments will now be described with reference to the Figures.

Figure 1:
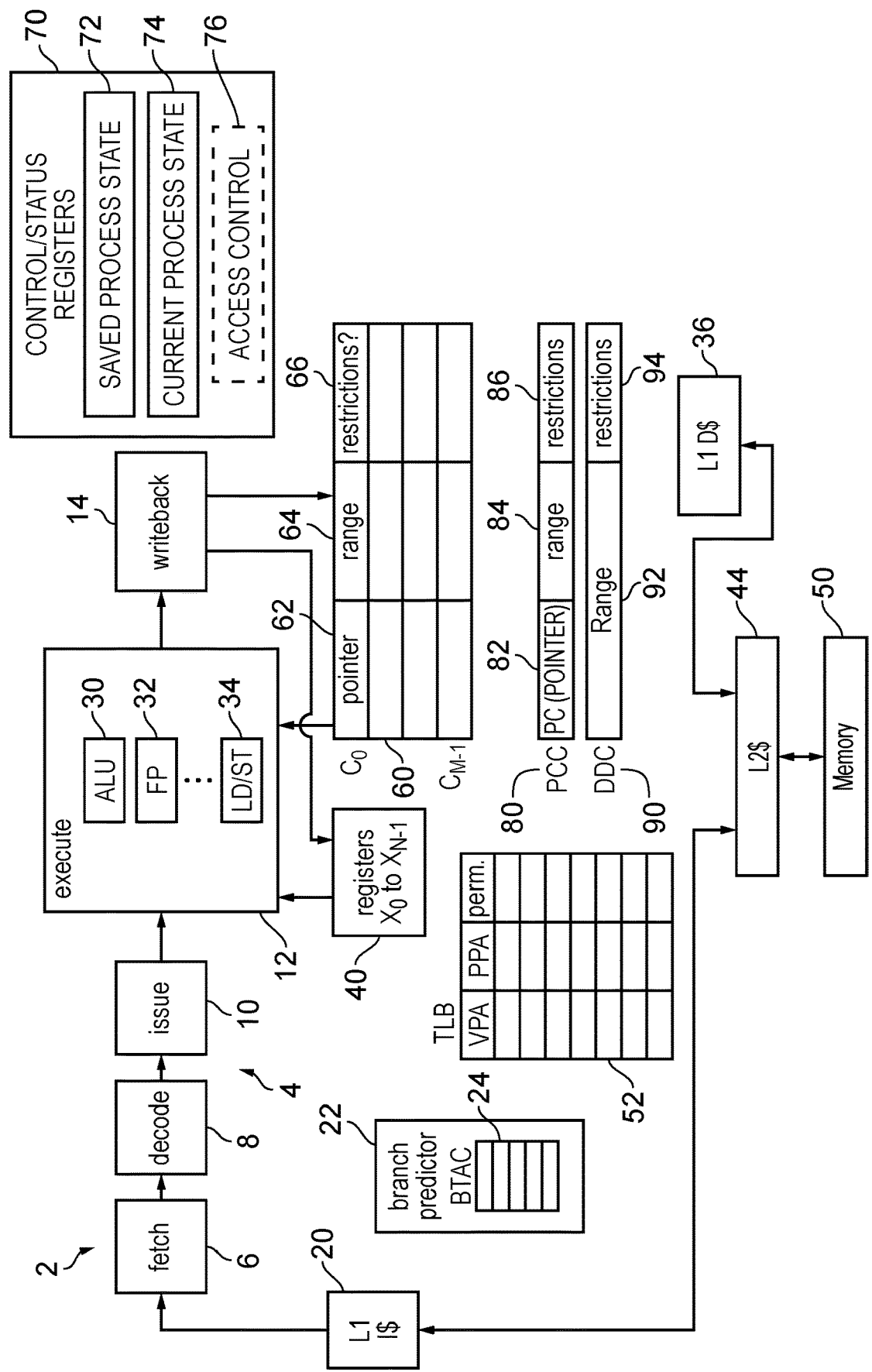
FIG. 1 is a block diagram of an apparatus in accordance with one embodiment.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (µops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. Optionally, the bounded pointer register 60 may also include other restriction information 66 (also referred herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. For example, when a memory access instruction is executed that identifies one of the bounded pointers to be used to identify a memory address, a bound check operation (also referred to herein as a range check operation) can be performed, to check with reference to the explicit range information provided for that bounded pointer, whether access to the memory address is to be permitted.

In an embodiment where the same physical storage is used for both general purpose data registers and bounded pointer registers, then in one embodiment the pointer value 62 may for example be stored within the same storage location as used for a corresponding general purpose register.

Figure 2:
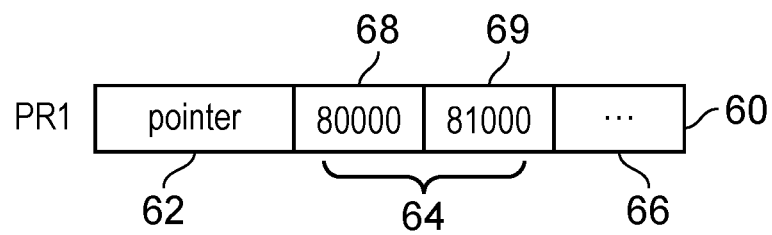
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception levels of the processor 4. In the embodiments to be described later herein, the processor is switchable between a default state and an executive state, and the above ability to change range information may be restricted to instances where the processor is operating in the executive state.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Further, in one embodiment non-bounded pointers may also be specified within the general purpose registers 40 and used when performing memory accesses. To limit memory addresses that may be accessed using such non-bounded pointers, a Default Data Capability (DDC) register 90 may be provided that specifies both range information 92 and any restriction data 94, similar to the range and restriction information included within any of the capability registers. Then, when a memory access instruction is executed that identifies a memory address with reference to a non-bounded pointer in a general purpose register 40, a bound check operation similar to the bound check operation performed in respect of bounded pointers can still be performed based on any address derived from that non-bounded pointer, but in this instance having regards to the range and restriction information held within the DDC register 90. By such an approach, it is possible for example for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

The range information and any associated restrictions specified in the PCC register 80 or the DDC register 90 can be set in a variety of ways. However, in one embodiment that information is determined using one or more of the bounded pointers available to the processing circuitry in the current capability domain, so that no memory address can be accessed using PCC or DDC based bound checks that resides outside the memory address range(s) identified for the current capability domain.

Figure 3:
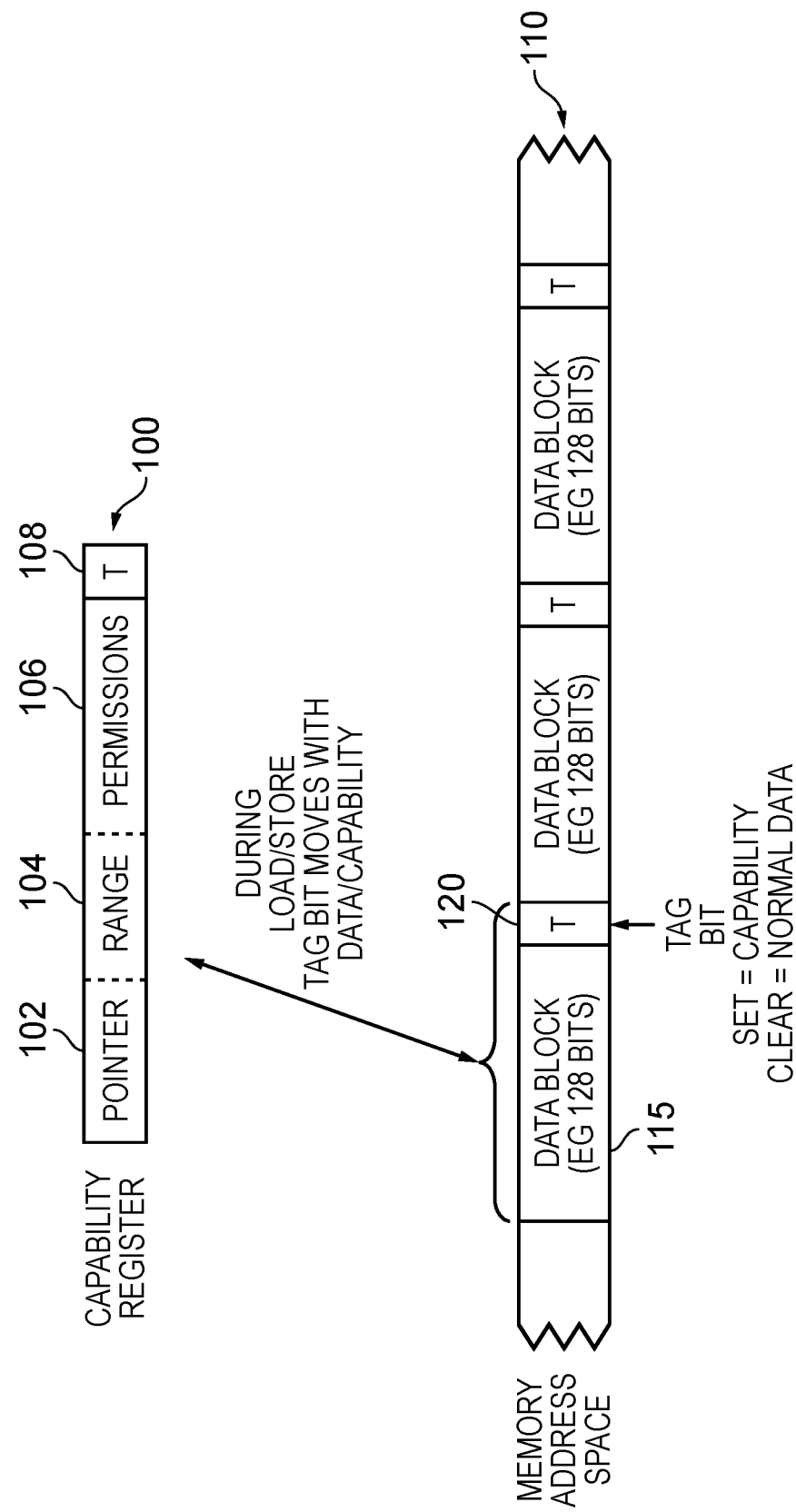
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

As mentioned earlier, the current set of bounded pointers available to the processing circuitry (whether directly accessible via the capability registers 60, or residing within a memory address space accessible via one of the bounded pointers in the capability registers) form a capability domain. Hence the capability domain identifies the available regions of memory that may be accessed by the processor, along with any associated permissions/restrictions. In order to provide a controlled mechanism for altering the capability domain, in accordance with one embodiment an additional state is provided, which will be referred to herein as the range check state. In particular, the range check state may be set to a default state or to an executive state. The default state is the typical state in which the processing circuitry will be set, and whilst in the default state all of the above mentioned range checks are performed when seeking to access memory. Hence, when seeking to access memory by identifying an address with reference to one of the bounded pointers in the bounded pointer storage elements 60, the range check operation will be performed using the associated explicit range information associated with that bounded pointer in the bounded pointer storage element. Similarly, when seeking to access a memory address derived from a non-bounded pointer in the general purpose registers 40, the default range information within the DDC register 90 will be referred to when performing the range check operation. Further, when the fetch stage 6 seeks to fetch an instruction from a specified memory address, the range information within the PCC register 80 will be referenced when performing the range check operation. Assuming the access is allowed to proceed having regards to the range check operation, then the relevant data or instruction will be retrieved from the memory address (either from one of the levels of cache 20, 36, 44 if the data/instruction is stored within the cache, or from the memory 50 in the event of the memory address missing in the cache levels).

However, when the processing circuitry is placed within the executive state, then in one embodiment any checks that would have been performed using the contents of the DDC register 90 or the PCC register 80 are disabled. Hence, in one embodiment if the bounded pointers continue to be used to identify memory addresses, then the range checks performed with reference to the explicit range information associated with those bounded pointers are still performed. However, the default range checks that arise through use of the DDC or PCC contents are disabled. As a result, when in the executive state, the processing circuitry can access memory using non-bounded pointers specified in the general purpose registers 40 without any checks being performed based on the DDC range information.

Similarly, the fetch stage 6 can fetch instructions from various memory addresses, without a range check being performed with reference to the range information in the PCC register 80. By disabling the PCC-based check, this allows the processing circuitry to retrieve instructions that may reside at memory addresses not residing within the allowable range of memory addresses of the current capability domain, thereby providing increased flexibility as to the instructions executed whilst in the executive state.

Further, by allowing non-bounded pointers to be used to access memory whilst in the executive state, without any range check being performed, this reduces the constraints placed by the capabilities whilst the processing circuitry is in the executive state, hence reducing the influence of those capabilities whilst in the executive state. This is illustrated schematically in FIG. 4.

In particular, as shown in FIG. 4 there are a number of ways in which data or capabilities can be accessed in memory. In particular, data can be accessed in memory using the mechanisms denoted by the boxes 150, 160, whilst capabilities can be accessed using the mechanisms denoted by the boxes 155, 165. With regards to the mechanisms themselves, these mechanisms differ dependent on whether a general purpose data register is used to identify the pointer (i.e. a non-bounded pointer) or whether a capability register 60 is used to identify the pointer (i.e. a bounded pointer). As shown by the boxes 160, 165, if a bounded pointer is specified, such that the memory address is derived from that bounded pointer, then an explicit capability check (including a range check) is performed using the range and restriction information specified for the relevant bounded pointer. In contrast, as shown by boxes 150 and 155, if a non-bounded pointer within the general purpose registers 40 is specified, and a memory address is derived from that non-bounded pointer, then a default capability check (also referred to herein as an implicit capability check) is performed using the default range and restrictions information in the DDC register 90.

When in the executive state, the mechanisms 150, 155 are effectively disabled. As a result, both general purpose data and capabilities can be moved between the registers 40, 60 and cache/memory via load or store instructions that specify non-bounded pointers within the general purpose registers 40, without any range check operation being performed. Accordingly, when in the executive state, the processing circuitry can access regions of memory that it would otherwise not be able to access based on the capability domain enforced when in the default state.

Returning to FIG. 1, the apparatus will have access to a variety of control/status registers 70 which store various control and status information referenced by the processing circuitry during its operation. This information will include current process state 74 which captures a variety of state information relating to the processor's current operation. Within this current process state information the above-mentioned current range check state is also captured, hence identifying whether the processing circuitry is operating in the default state or the executive state. Whilst shown as a single box 74, the current process state will not necessarily all be stored within a single register, but may be stored within a number of control and status registers within the available control/status registers 70.

In accordance with one embodiment, entry to the executive state is constrained to only take place on occurrence of certain predetermined events. In particular, in one embodiment the event which cause entry to the executive state is the taking of an exception. The taking of an exception may be triggered by a variety of different mechanisms, for example an interrupt, a system call, a fault, etc. In accordance with one embodiment, when such an exception is taken, the processing circuitry's range check state is caused to transition to the executive state irrespective of the range check state in place at the time the exception was taken. However, in addition, on taking such an exception, the current process state 74 is captured as saved process state 72. Again, the saved process state 72 may be stored within a single register or within multiple registers. As part of the saved process state, the current range check state that existed at the point the exception was taken is also saved, hence identifying whether the processing circuitry was in the default state or the executive state at the time the exception was taken. Within the current process state 74 the current range check state is then updated to the executive state, whereafter an exception handling operation is performed by the processing circuitry to process the exception. Whilst in the executive state, any default range check operations are disabled as discussed earlier, hence enabling a change to be made to the set of capabilities that will be made available to the processing circuitry on return from the exception.

When the processing circuitry subsequently returns from the exception, the saved process state will be restored into the current process state, allowing the processing circuitry to continue the operations that it was performing prior to the exception being taken. However, at this point, it may be operating using a revised capability domain, due to modifications made to the available set of bounded pointers whilst the processing circuitry was in the executive state.

As also shown in FIG. 1, the control/status registers 70 may optionally be supplemented with an access control register 76. The purpose of this register will be discussed later with reference to FIGS. 10 and 11.

FIG. 5 illustrates the saved process state register 72 in more detail. In particular, on taking an exception, the process state 170 of the current exception level of the processor is captured within one or more fields of the saved process state register 72. The exception level identifies the level of software execution privilege, and, as will be discussed later, in one embodiment the processing circuitry may be able to operate at multiple different exception levels, with a transition between those exception levels being available via the taking of an exception. In the event that multiple exception levels are available to the processing circuitry, then the saved process state will include, as part of the state information, the current exception level that the processor was executing at prior to the exception being taken. However, the techniques of the described embodiments utilising the default and executive states of the range check state can be implemented irrespective of whether there are multiple exception levels available to the processor or only a single exception level. In particular, the transition between the default and the executive state, and back to the default state, can take place irrespective of whether there is any change in exception level during that process, and hence the range check state can be viewed as being orthogonal to the exception level of the processor.

As shown in FIG. 5, in addition to the usual process state information 170 captured within the saved process state register, a range check state field 175 is also provided within which is captured the current range check state of the processing circuitry at the point just prior to the exception being taken. From the earlier description of the range check state, it will be appreciated that this information effectively identifies how the capabilities constrain memory accesses, and accordingly herein the range check state may also be referred to as a capability influence state.

As discussed earlier, the current range check state may take either a default (i.e. restricted) state, where both explicit and implicit (default) capabilities are checked on access to memory, or an executive state (activated on taking an exception), where any implicit capabilities are not checked on access to memory. In one embodiment, the explicit capabilities are still checked in the executive state, and hence any access where the memory address is derived from a bounded pointer is still checked having regards to the explicit range and restriction information for that bounded pointer. However, in an alternative embodiment, such explicit capability checks may also be disabled whilst in the executive state, hence providing further flexibility as to the memory addresses that can be accessed by the processing circuitry when in the executive state.

FIG. 6 is a flow diagram illustrating steps performed when an exception is taken in accordance with one embodiment. In particular, when it is determined at step 200 that an exception is to be taken, then at step 205 the current process state (including the current exception level of the processor) is captured in the saved process state register 72. In addition, as discussed earlier, the current range check state is also stored as part of that process state within the saved process state register.

Thereafter, at step 210 the executive state is selected as the current process state, by updating the appropriate field within the current process state 74. The executive state is selected irrespective of the range check state at the point the exception was taken.

Thereafter, at step 215, any steps required to change the capability domain are performed whilst the processing circuitry is performing the exception handling operation in the executive state.

Thereafter any other steps required by the exception handling operation are performed. Whilst these can be performed in one embodiment whilst staying in the executive state, in an alternative embodiment the processing circuitry will return to the restricted (i.e. default) state for these additional steps performed at step 220. In particular, this latter approach may be taken in embodiments where multiple exception levels are provided, and where the taking of the exception caused a transition from a first exception level to a second exception level.

Thereafter the process proceeds to step 225 where the process returns from the exception. At this point, the saved process state information 72 is restored to the current process state 74 so as to allow the processing circuitry to be placed back into the state that existed prior to the exception being taken.

When during step 220 it is decided to return to the restricted state for at least a part of the exception handling operation, then it may in one embodiment be possible for the return from the exception to occur directly from that restricted state. However, in an alternative embodiment the processing may be arranged so that a further exception occurs to cause a transition back to the executive state prior to then returning from the original exception, so as to ensure that the return from the original exception occurs from the executive state. If the exception handling processing is forced to re-enter to the executive state prior to returning from the exception, this can avoid the potential for the exception return seeking to return from the restricted state to the executive state (it being possible that the processing circuitry was in the executive state prior to the original exception being taken). Otherwise, some special case handling may need to be introduced when handling an exception return to deal with situations where the exception return is seeking to return from the restricted state to the executive state. This will be discussed in more detail with reference to FIG. 7.

In particular, when at step 250 it is determined that an exception return is to take place, the process proceeds to step 255, where it is determined whether the processing circuitry is currently in the executive state. As mentioned earlier, in one embodiment, it could be enforced that the processing circuitry will always be in the executive state at the time the exception return is to be taken, in which case the process will always proceed to step 260, where the processor will be restored to the process state saved in the SPSR register 72, as a result of which the current range check state will be restored to the range check state stored in the SPSR register.

However, if embodiments allow that the exception may return from either the executive state or the default state, then if it is determined at step 255 that the processing circuitry is not currently in the executive state, the process proceeds to step 265 where it is determined whether the SPSR register identifies that the saved range check state is the executive state. If not, then the process can proceed to step 260, but if the saved range check state is the executive state, the process instead proceeds to step 270 where special case handling is performed.

The special case handling can take a variety of forms, but in one embodiment involves triggering a further exception to initiate suitable exception handling. Alternatively, the processor can be restored to the process state saved in the SPSR, but the current range check state is set to the restricted state rather than the executive state that had been captured in the SPSR. As a result, the processing circuitry will be forced into the restricted state upon return from the exception, and accordingly all of the range checks applicable to the current capability domain will be enforced.

FIG. 8 illustrates the interrelationship between the various exception levels in one embodiment. The exception level EL0 has the lowest software execution privilege, and execution at EL0 is called unprivileged execution. Increased values of n, from 1 to 3, indicate increased software execution privilege. The EL2 exception level provides support for processor virtualisation. Meanwhile the EL3 stage provides support for two security states, namely the secure and the non-secure states.

This gives rise to the general tree structure shown in FIG. 8. In particular, if an EL3 exception level is provided, such as EL3 300 shown in FIG. 8, it will run in a secure state. In the non-secure state, it is possible if desired to support virtualisation, and accordingly an EL2 exception level 305 may be provided in the non-secure state. Within the secure state, in one embodiment, an EL2 level is not provided, and instead an EL1 level 330 may be provided within the secure state, under which a number of different EL0 levels 340, 342 may be provided.

In the non-secure state, if an EL2 level 305 is provided, it may support beneath that multiple EL1 levels 310, 312, 314, and each of those EL1 levels may support one or more EL0 levels, as shown schematically by the reference numerals 320, 322.

Transitions between the various exception levels take place via the taking of exceptions. However, not all exceptions will cause the exception level to change. For example, in one embodiment exceptions from EL0 are usually taken in EL1 (although in some configurations EL2). Exceptions from EL1 and above may in one embodiment generally be taken in the same exception level. However, various exceptions from EL1 to EL2/EL3 and from EL2 to EL3 may also be provided and can be used for a similar purpose. Exceptions in EL3 are always taken in EL3 in one embodiment. As shown in FIG. 8, saved process state registers can be provided in association with each of the exception levels. If it is always the case that exceptions from EL0 are taken in EL1, then there is no need for a separate SPSR in association with the EL0 level. However, in one embodiment it may be arranged that certain exceptions from EL0 can be taken in the EL0 level, and in that event a separate SPSR register for EL0 may be provided.

FIG. 9 illustrates an example sequence of transitions that may occur as a result of taking exceptions, in accordance with one embodiment. It is assumed that at the start the processing circuitry is in the restricted/default state and executing at EL0. At point 400, an exception is taken to the EL1 level, as a result of which the SPSR register associated with the EL1 level captures the current process state of the processor whilst it was at the EL0 level, including capturing the restricted state as the saved range check state. On transitioning to the EL1 stage at point 405, processing begins in the executive state, and accordingly the exception handling operation may perform modifications to the set of bounded pointers available to the processing circuitry, and hence alter the capability domain. Following any steps that are required to be performed in the executive state, the remainder of the exception handling operation may be performed whilst remaining in the executive state, or in one embodiment the processing circuitry may switch back to the restricted state for the remainder of the exception handling operations.

At point 410, it is assumed that another exception is taken from the EL1 level to the EL2 level. Accordingly, the SPSR register associated with EL2 will capture the state X of the processing circuitry at point 410. As part of this captured process state X, the range check state in place at point 410 will be captured, which may be the executive state or the restricted state depending on the processing performed between points 405 and 410.

Irrespective of the current range check state at point 410, when the EL2 level is entered at point 415, processing will begin in the executive state. As discussed earlier with reference to the processing performed at step 405, this will allow the processing circuitry to make changes to the capability domain if desired, and thereafter processing may continue in the executive state, or the range check state may be switched back to the restricted state.

At point 420, it is assumed that a return from the current exception takes place, at which point the processing circuitry at the EL2 level will be in state Y (where the range check state may be either in the executive state or the restricted state).

During the return to EL1 level at point 425, the contents of the SPSR register associated with level EL2 will be copied into the current process state register 74 in order to return the EL1 state to state X. However, in the event that state Y identified the restricted state, and state X identified the executive state, then the earlier mentioned special case handling of step 270 of FIG. 7 will in one embodiment be performed.

The processing circuitry will then continue in level EL1 between points 425 and 430, at which point a return from the original exception is performed to return back to the EL0 level at point 435. As part of this process, the SPSR register associated with the EL1 level will be used to restore into the current process state 74 the saved process state captured at point 400, thereby returning the processing circuitry to the restricted state at point 435.

As mentioned earlier with reference to FIG. 1 an access control register 76 can be provided in one embodiment. In particular, at each exception level a program may have access to a number of system registers and operations such as translation context controls, system call and exception return. Access to this functionality can potentially undermine the security provided by the capability domain, and the provision of the access control register provides a mechanism for restricting access to distinct sets of these functions whilst in certain capability domains. In particular, as shown in FIG. 10, the access control register 76 may comprise a plurality of fields 452, 454, 456, each field being associated with a particular set of functionality. The value in each field identifies whether the corresponding functionality is accessible to the processing circuitry or not. In one embodiment, a single access control register 76 can be provided for all exception levels, but alternatively a separate access control register can be provided for each exception level.

As shown in FIG. 11, if the processing circuitry is determined at step 470 to be in the executive state, then the process proceeds to step 475 where the processor's access to the functionality is independent of the access control register content. Hence, the values within the access control register have no effect when the processing circuitry is in the executive state. Instead the processing circuitry may have unrestricted access to the functionality, or its access may be determined by certain pre-existing access control mechanisms.

However, if it is determined at step 470 that the processing circuitry is not in the executive state, then as indicated by step 480 the functionality accessible to the processor is determined by the access control register content. Accordingly, the functionality available to the processing circuitry in the default state can be further restricted through the use of such an access control register, to provide additional constraints over and above any constraints applicable when in the executive state.

It should also be noted that the access control register fields will not necessarily correspond with all of the available functionality accessible by the processing circuitry. Accordingly, in one embodiment any existing access controls on sets of functionality that are not covered by the fields of the access control register remain in effect irrespective of whether the processing circuitry is in the default state or the executive state.

In one embodiment, when the processing circuitry is executing in the default state it is not able to make any modification to the contents of the access control register 76. Instead, modifications to the access control register are limited to the processing circuitry executing in the executive state. In an embodiment having separate access control registers for individual exception levels, it may be arranged that the access control register for at least one exception level is only modifiable by processing circuitry executing in the executive state at a higher exception level.

The above described embodiments provide an efficient and controlled mechanism for allowing the capability domain available to the processing circuitry to be altered during operation of the data processing apparatus. By providing a dedicated executive state for this purpose, and restricting entry to the executive state to a predetermined event such as the taking of an exception, it provides a controlled environment for temporarily disabling certain range checks so as to enable changes in the sets of bounded pointers defining the capability domain to be made.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
processing circuitry to execute a sequence of instructions;
a plurality of storage elements accessible to the processing circuitry, for storage of bounded pointers and non-bounded pointers, each bounded pointer having explicit range information associated therewith indicative of an allowable range of memory addresses when using said bounded pointer; and
a current range check storage element to store a current range check state for the processing circuitry;
when the current range check state indicates a default state, the processing circuitry being responsive to execution of a memory access instruction in the instruction sequence identifying a pointer to be used to identify a memory address, to perform a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing circuitry;
on detection of at least one event, the current range check state being set to an executive state, and when in the executive state the processing circuitry being responsive to execution of said memory access instruction to disable the range check operation when the identified pointer is a non-bounded pointer.

2. An apparatus as claimed in claim 1, wherein said at least one event comprises taking of an exception by the processing circuitry.

3. An apparatus as claimed in claim 2, further comprising:
a saved range check storage element to store a saved range check state;
on taking of the exception the saved range check storage element being updated to store as the saved range check state the current range check state used by the processing circuitry prior to the current range check state being set to the executive state in response to the exception being taken.

4. An apparatus as claimed in claim 3, wherein on return from the exception the current range check storage element is updated to identify as the current range check state the saved range check state.

5. An apparatus as claimed in claim 2, wherein on taking the exception the processing circuitry is arranged to perform an exception handling operation during which one or more memory accesses are performed whilst in the executive state to alter a set of bounded pointers that will be available to the processing circuitry on return from the exception.

6. An apparatus as claimed in claim 1, wherein when in the executive state the processing circuitry is responsive to execution of said memory access instruction to further disable the range check operation when the identified pointer is a bounded pointer.

7. An apparatus as claimed in claim 1, further comprising a default range storage element to store the default range information.

8. An apparatus as claimed in claim 1, wherein:
the processing circuitry is arranged to issue a fetch memory address to identify an instruction to be fetched for subsequent execution by the processing circuitry, when in the default state the processing circuitry being arranged to perform a fetch range check operation prior to issuing the fetch memory address in order to determine, with reference to default fetch range information defined for the processing circuitry, whether access to the fetch memory address is permitted; and
when in the executive state the processing circuitry being arranged to disable the fetch range check operation.

9. An apparatus as claimed in claim 8, wherein the fetch memory address is determined by a program counter value and the default fetch range information is program counter range information.

10. An apparatus as claimed in claim 1, wherein the processing circuitry is operable at a plurality of exception levels, each exception level having different software execution privilege, and the processing circuitry being arranged, in response to at least a subset of exceptions taken by the processing circuitry, to change the exception level that it is operating at.

11. An apparatus as claimed in claim 10, wherein, when the processing circuitry is operating at at least one of the exception levels, the current range check state is changeable between the executive state and the default state whilst remaining at the same exception level.

12. An apparatus as claims in claim 3, wherein:
the processing circuitry is operable at a plurality of exception levels, each exception level having different software execution privilege, and the processing circuitry being arranged, in response to at least a subset of exceptions taken by the processing circuitry, to change the exception level that it is operating at; and
taking the exception causes the processing circuitry to transition from a first exception level to a second exception level, the saved range state storage element is updated to identify the range check state being used by the processing circuitry at the first exception level prior to the exception being taken, and the current range check state is set to the executive state on transitioning the processing circuitry to the second exception level.

13. An apparatus as claimed in claim 12, wherein during operation at the second exception level the processing circuitry is arranged to change the current range check state from the executive state to the default state.

14. An apparatus as claimed in claim 13, wherein on return from the exception the processing circuitry is arranged to transition back to the first exception level, and the current range check storage element is updated to identify as the current range check state the saved range check state unless this would cause the current range check state to change from the default state to the executive state on return from the exception.

15. An apparatus as claimed in claim 1, further comprising:
an access control storage element having one or more fields, each field being associated with a corresponding set of functionality and having a value indicating accessibility of that corresponding set of functionality to the processing circuitry when the processing circuitry is in said default state;
when in the executive state, the processing circuitry's access to each corresponding set of functionality being independent of the associated value in the access control storage.

16. An apparatus as claimed in claim 15, wherein in the default state the processing circuitry is prevented from updating the access control storage element.

17. A method of operating an apparatus having processing circuitry to execute a sequence of instructions, and a plurality of storage elements for storage of bounded pointers and non-bounded pointers for access by the processing circuitry, each bounded pointer having explicit range information associated therewith indicative of an allowable range of memory addresses when using said bounded pointer, the method comprising:
storing a current range check state for the processing circuitry;
when the current range check state indicates a default state, then responsive to execution of a memory access instruction in the instruction sequence identifying a pointer to be used to identify a memory address, performing a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing circuitry; and
on detection of at least one event, setting the current range check state to an executive state, when in the executive state the processing circuitry being responsive to execution of said memory access instruction to disable the range check operation when the identified pointer is a non-bounded pointer.

18. An apparatus, comprising:
processing means for executing a sequence of instructions;
a plurality of storage element means for access by the processing means, and for storage of bounded pointers and non-bounded pointers, each bounded pointer having explicit range information associated therewith indicative of an allowable range of memory addresses when using said bounded pointer; and
a current range check storage element means for storing a current range check state for the processing means;

when the current range check state indicates a default state, the processing means for performing, responsive to execution of a memory access instruction in the instruction sequence identifying a pointer to be used to identify a memory address, a range check operation to determine whether access to that memory address is permitted, when the memory access instruction identifies as the pointer one of said bounded pointers the range check operation being performed with reference to the explicit range information associated with that bounded pointer, and when the memory access instruction identifies as the pointer one of said non-bounded pointers the range check operation being performed with reference to default range information defined for the processing means;

on detection of at least one event, the current range check state being set to an executive state, and when in the executive state the processing means for disabling the range check operation during execution of the memory access instruction when the identified pointer is a non-bounded pointer.

* * * * *